United States Patent [19]

Lisson et al.

[11] Patent Number: 5,705,803
[45] Date of Patent: Jan. 6, 1998

[54] COVARIANCE FOCUS SENSOR

[75] Inventors: Jerold Burton Lisson, Henrietta; Norbert William Zoltowski, Lakeville, both of N.Y.

[73] Assignee: Eastman Kodak Company, Rochester, N.Y.

[21] Appl. No.: 685,263

[22] Filed: Jul. 23, 1996

[51] Int. Cl.$^6$ ............................................. G02B 27/64
[52] U.S. Cl. .............................. 250/201.7; 396/107
[58] Field of Search ......................... 250/201.2, 201.7; 396/107

[56] References Cited

U.S. PATENT DOCUMENTS

Re. 32,886  3/1989  Stauffer .................. 250/201.2
4,341,953  7/1982  Sakai et al. ............... 250/204

OTHER PUBLICATIONS

Peter Carellas, "Taking the Blur Out of Autofocus Camera Mechanisms", *Optics and Photonics*, Sep. 1993, pp. 6, 7, and 28.

*Primary Examiner*—Edward P. Westin
*Assistant Examiner*—Kevin Pyo
*Attorney, Agent, or Firm*—Thomas H. Close

[57] ABSTRACT

A focus sensor for detecting the focus state of an image forming optical system relative to an object, the optical system having a plane of best imaging focus, includes: a plurality of image detectors located at a corresponding plurality of positions relative to the plane of best imaging focus for producing a respective plurality of image signals; and a signal processor connected to the image detectors for determining a position of best focus by calculating the covariances between respective pairs of the image signals.

12 Claims, 8 Drawing Sheets

LEGEND
● VARIANCES ($C_{aa}, C_{bb}, C_{cc}$); PAIRS OF SIGNALS EACH FROM SAME DETECTOR
□ COVARIANCES ($C_{ab}, C_{bc}$); PAIRS OF SIGNALS FROM ADJACENT DETECTORS
◇ COVARIANCES ($C_{ac}$); PAIR OF SIGNALS FROM DETECTORS SEPARATED BY ONE DETECTOR

LEGEND
- ● VARIANCE ($C_{aa}, C_{bb}, C_{cc}, C_{dd}$); PAIRS OF SIGNALS EACH FROM SAME DETECTOR
- □ COVARIANCES ($C_{ab}, C_{bc}, C_{cd}$); " " " FROM ADJACENT DETECTORS
- ◇ COVARIANCES ($C_{ac}, C_{bd}$); " " " FROM DETECTORS SEPARATED BY ONE DETECTOR
- ■ COVARIANCE ($C_{ad}$); " " " FROM DETECTORS SEPARATED BY TWO DETECTORS
- ○ VIRTUAL VARIANCE

COVARIANCE FOCUS SENSOR

FIELD OF THE INVENTION

The invention relates generally to the field of focus sensors for sensing and correcting the focus condition of an image forming optical system to an object, and in particular to such focus sensors employing a plurality of detector arrays arranged at a plurality of positions with respect to a focal plane of the optical system. Each detector is placed at different calibrated focal plane positions to sample the focus quality of the lens and thereby provide image contrast information for the correction and adjustment of the lens to a best system focus; the lens focus which provides maximal image quality.

BACKGROUND OF THE INVENTION

Lens defocus is a serious degrader of image quality. This creates a need for focus error detection systems that can accurately measure the degree of defocus of an image forming optical system and provide an appropriate correction signal.

Prior-art focus sensors employing image contrast measurements to detect best focus are described in U.S. Pat. No. 4,341,953 issued Jul. 27, 1982 to Sakai et al. concerning two and three detector systems. In the case of two detectors, the focus of the lens is adjusted until the image contrasts as sensed by the two detectors are equal. This occurs only when the focused image falls midway between the two detectors where the best image forming plane is deterministically collocated. This plane is denoted herein as the best focal plane setting for the photographic system. A summary representation of the three detector sensor principle is provided in the article "Taking the Blur Out of Autofocus Mechanisms" by Peter Carrellas published in *Optics and Photonics*, September 1993, pages 6, 7, and 28, which shows a contrast focus sensor using three detectors. The three detectors are arranged at three different focal plane positions along the optical axis, one in front, one at, and one behind the best focal plane.

Sensor detectors may be comprised of linear or area photodetector arrays, such as a CCD array which includes a number N of photosensors (pixels) adequate to resolve spatial contrast detail. Alternatively, each detector may be a single monolithic photosensor that is sampled on a time basis involving N temporal samples such as obtained when an aircraft or satellite in its trajectory provides relative movement between a mounted camera and object of interest. The relative motion of the image formed by the optical system is used to sequentially expose each monolithic sensor detector to the same portion of a scene. The temporal contrast variation supplies the focus error signal.

The statistical variance is used in prior art sensors to quantify the image spatial contrast recorded by a detector consisting of an array of photosensitive elements or pixels. For a one detector sensor, the peak contrast variance occurs at the focal plane of the lens. Thus when the detector is located at the best focus plane of the system, or conjugate thereto, maximum variance indicates coincidence of the lens focal plane with the best focus plane of the system and the camera is set for the recording of maximal image quality or resolution. Prior art products are thereby denoted in the invention as variance focus sensors (VFS).

Sensors with two detectors are used in the nulling mode where the variance from each is differenced. In the null system, the detectors are symmetrically located about the best focus plane for the system and therefore when the lens is focused at a plane midway between the detectors, a zero or null condition is obtained which indicates that the camera is in best focus. The null condition holds because the two detectors are equally defocused and thus provide equal image contrast variance.

Focus sensors with three detectors allow peak variance estimation using second-order curve fitting to the three available contrast variance data. In this system, a centrally positioned sensor detector is calibrated in position to the plane of best focus with the remaining two symmetrically displaced about this plane. Thus, the peak variance indicated by the curve fit will locate at the position of the central detector when the camera lens is focused at the best focal plane. If the fitted variance versus focal position does not peak at the location of the central detector, the lens is defocused and is repositioned until this condition is achieved.

Multi-detector images may be simultaneously or sequentially acquired. In the former acquisition approach, a beam splitter is usually used to provide a contrast image to each detector whereas in the latter the relative motion of the object with respect to the optic is used to sequentially expose each detector to the image. An advantage of simultaneous acquisitions is that images are obtained over shorter time intervals thereby minimizing dynamic effects. However, the sequential acquisition advantage, besides eliminating the need for beam splitters, provides greater energy throughput per unit time per detector. The accuracy of either approach is limited by the number of detectors and the number of contrast sensing elements, pixels or photosensors, per detector. For any sensor system there is an optimum value for the product, P*N, where P is the number of detectors and N is the number of photo-sensitive elements per detector. A second limiting factor is the random-uncorrelated noise inherent in the detection process, such as is associated with thermal and Schott noise effects.

SUMMARY OF THE INVENTION

The present invention is directed to overcoming the above limiting factors. In one aspect of the invention, the limitations are overcome by providing a focus sensor for detecting the focus state of an image forming optical system relative to an object, the optical system having a plane of best imaging focus, includes: a plurality of image detectors located at a corresponding plurality of positions relative to the plane of best imaging focus for producing a respective plurality of image signals; and a signal processor connected to the image detectors for determining a position of best focus by calculating the covariances between respective pairs of the image signals. It includes image contrast detectors and a signal processor connected to said detectors for determining the position of best focus by calculating the covariance between respective pairs of detected image signals in addition to the variance signals of the prior art. Sensors with more than two detectors may be used in pair-wise combinations which exploit the characteristics of single detector and two detector geometry's to further expand the advantages inherent in covariance data processing. The statistical covariance is the quality merit function of the present invention and is denoted herein as the covariance focus sensor (CFS).

ADVANTAGEOUS EFFECTS OF THE INVENTION

A key observation of the invention is the relationship between the maximum covariance of two detector signals with their associated variance null in determining a plane of lens focus. Both the maximum covariance and variance null provide information with regard to the best focus location of the system but the covariance is superior for two reasons: 1- the covariance is less susceptible to detector channel noise; and, 2- it is positively correlated with the variance which is the best focus merit function for the VFS. The latter advantage allows the combined best focus evaluation using combined covariance and variance data. Indeed, the variance is defined in the invention as a special case of the covariance computation. Detector pair covariance provides information that reduces the granularity in focus position as constrained by a finite number of focal position detectors by providing a 'virtual' detector midway between all detector pairs. This result is based on the observation that when the lens is focused midway between any detector pair, adjacent or not, the covariance of their signals is peaked and equal to the variances recorded by each component detector.

The CFS provides the following two advantages over the prior art VFS. It provides additional statistical data thereby improving the determination of best focus location. For example, for a three detector sensor three covariances are available in addition to the three variances used in prior-art sensors. The CFS also provides greater immunity to detector channel noise. The covariance is statistically less biased by random error, relative to the variance, because the noise error signal from each detector in any pair is inherently random and uncorrelated in nature. It thereby follows that in the case of spatial contrast sensors all noise products in the covariance computation based on the signals from two detectors approach zero asymptotically with an increasing number of photosensitive elements per detector. A similar benefit occurs for an increasing number of temporal samples for a scanning monolithic detector.

DESCRIPTION OF THE INVENTION

The covariance $C_{jk}$ of the image signals from two focal plane detectors at sampling locations j and k is computed as:

$$C_{jk}=[1/(N-1)]\cdot[\Sigma(S_j(m)-S_j)\cdot(S_k(m)-S_k)]; m=1,2,3,\ldots,N \quad (1)$$

where $S_j(m)$ and $S_k(m)$ are the signals produced by the detectors located at positions j and k respectively for readout from pixels m=1 through N; $S_j$ is the mean value of all pixel signals produced by the detector located at position j; and $S_k$ is the mean value of all pixel signals produced by the detector located at position k.

In a three detector CFS sensor, computations similar to the above are made for all pairs of detector combinations thereby obtaining the six quantities $C_{aa}$, $C_{bb}$, $C_{cc}$, $C_{ab}$, $C_{bc}$, and $C_{ac}$ including the three variances $C_{aa}$, $C_{bb}$, $C_{cc}$ available with prior-art sensors and the three covariances $C_{ab}$, $C_{bc}$, and $C_{ac}$ supplied by the CFS Note that the variances of the prior-art VFS, $C_{aa}$, $C_{bb}$, $C_{cc}$, are all computations obtained from single detectors at focal plane positions a, b and c respectively. Therefore, detector channel noise which is primarily random and uncorrelated, when squared and averaged in the variance computation, approaches a constant non-zero noise variance, as the number of detector photosensitive elements are increased. In contrast, the noise variance in the covariance calculations involve an average of the random uncorrelated noise products of the signals from two separate detectors and thereby asymptotically approaches zero as the number of detector photosensitive elements increase. This represents, in addition to providing additional sample information in the form of higher-order covariances, a noise advantage over the prior-art VFS.

In the following discussions, a scanning imager application sensor is exemplified using a three or four detector CFS for focus maintenance with each detector comprised of an array of N pixels or photosensitive elements. The temporal lag between the arrival of identical scene portions at each focus sampling detector is accounted for by appropriate read-out timing or processing statistics such as the peaking of the higher-order covariances provided as a by-product during CFS data processing. The results are readily extended to focus sensors using an arbitrary number of detectors or those using devices such as beam splitters as used in still camera applications.

THREE DETECTOR CFS

Figure 1:
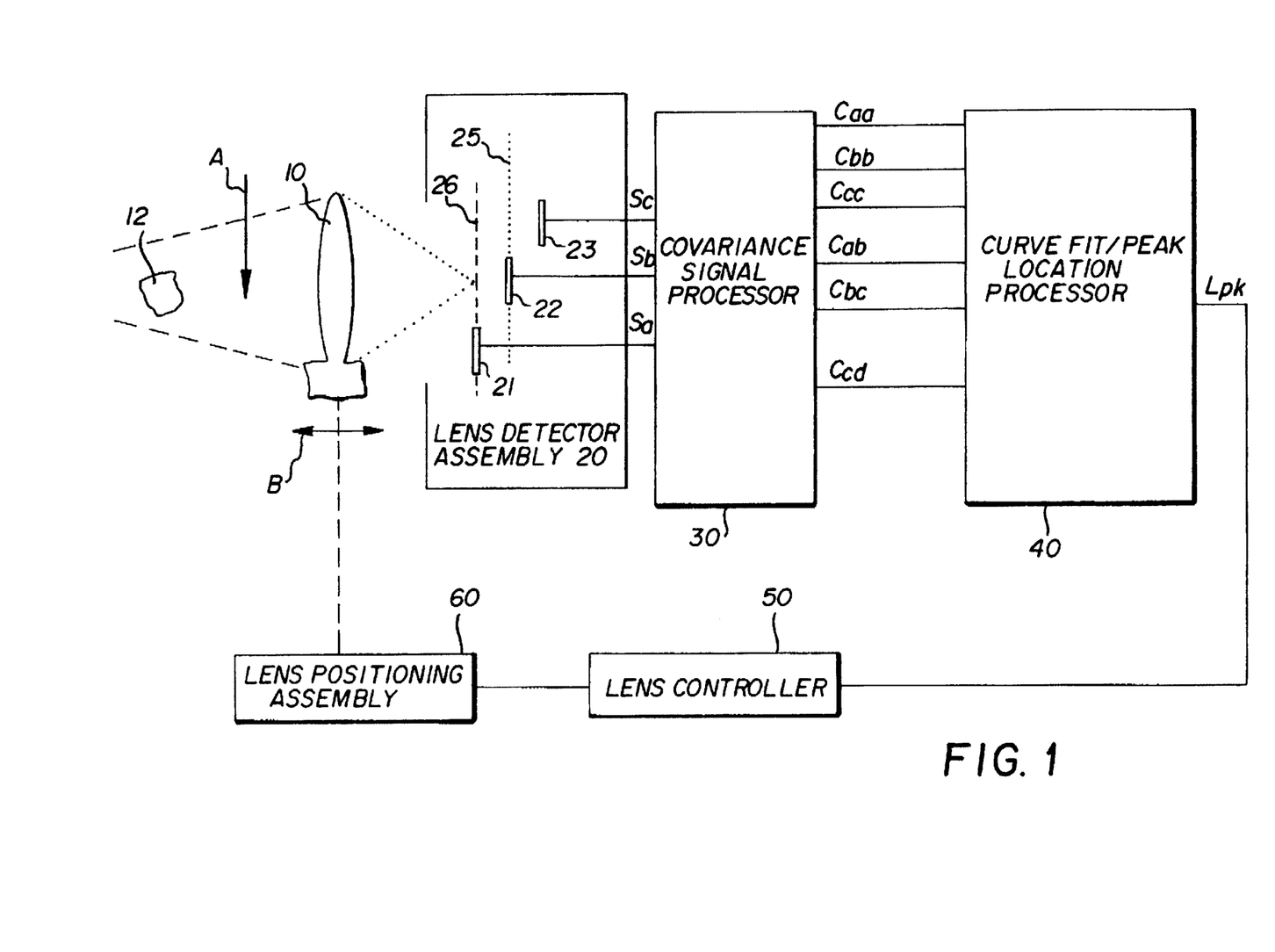
FIG. 1 is a schematic diagram of a scanning three detector CFS as used in the peak-mode of operation.

FIG. 1 shows a CFS three detector embodiment that uses the covariance as defined by equation (1). A lens 10 forms an image of an object 12 at a plane 26. The lens 10 and detector are moving relative to object 12 in the direction of arrow A to scan the object 12. Three sensor detectors 21, 22, and 23, are located at calibrated focal plane positions a, b, and c respectively of lens detector assembly 20 relative to the plane of a primary detector such as a photographic film or a solid state image sensor which is located in the best imaging focus plane. Detector 22 at location b is at or conjugate to this plane 25, detector 21 at location a, in front of the plane 25 and detector 23 at location c, behind the plane 25. In particular, detectors 21 and 23, located at positions a and c respectively, are at equal distances from the best imaging focus plane 25 and will thus experience equal but larger image focus blur relative to that at detector b when the lens is positioned to focus the image of an object at plane 25. Since blur reduces image contrast, the variance of the signal, $S_b$ from detector b will exceed the corresponding variances of the signals $S_a$ and $S_c$ from detectors a and c respectively when the image of the object is focused at plane 25.

The signals $S_a$, $S_b$, and $S_c$ are input to covariance signal processor 30 which calculates the three variance and the three covariance values. The variance and covariance values are input to a curve-fitting/peak location processor 40 which determines the location, $L_{pk}$ of the plane of best focus 26 for object 12. The location $L_{pk}$ is input to the lens controller 50 which determines the amount that lens 10 needs to be moved so that object 12 is focused at plane 25, and generates a focus error signal representing this amount of movement. The resulting error signal is then used by the lens position assembly 60 to move the lens in the direction of arrow B to reduce the difference to zero and thereby regain best imaging focus at plane 25.

Figure 2:
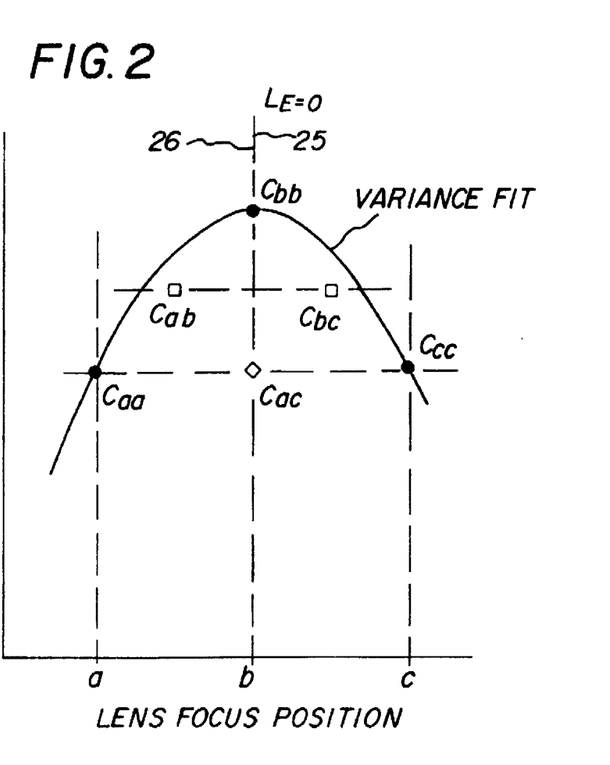
FIG. 2 is a curve fit of the variances/covariances of the signals produced by the CFS of FIG. 1 plotted against detector location for the best focus case.

When lens 10 focuses the image of object 12 at plane 25, the variance computed for the detector 22 signal, $S_b$, will exceed that of the other two detectors, which, due to their equal but greater blur degradation will provide equal but smaller variance values. A plot showing the relative magnitude of the variances and covariances for the out of focus condition of is shown in FIG. 2.

CFS Defocus Conditions—three detectors

1. $C_{bb}$ is not maximum; $C_{aa}-C_{cc} \neq 0$; peak variance not at focal position b and thus $L_E$, the distance from best imaging focus plane 25 is not zero.

2. covariance null result: $C_{ab}-C_{bc} \neq 0$ which supports result $L_E=0$.

Figure 3:
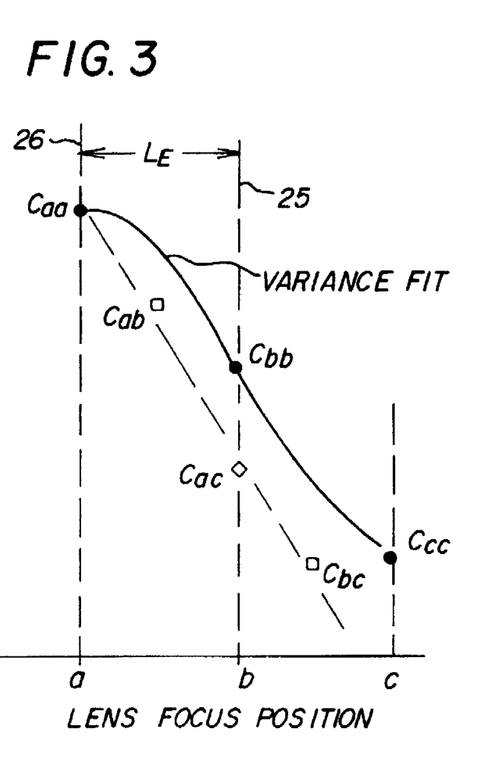
FIG. 3 is a graph showing the variances/covariances of the signals produced by the CFS of FIG. 1 plotted against detector location for the defocus case.

The peak of the fitted variance data, $L_{pk}$ as indicated in FIG. 3, is compared to the desired location at b, the location of detector 22. The lens position is changed manually or by servo control using lens controller 50 and the lens positioning assembly 60 until lens position of best focus is attained by movement of lens 10. In this position the sensor has reduced the focus error to zero, or $L_{pk}=b$ and regains the best focus imaging focus state shown in FIG. 2.

A plot showing best imaging focus variance and covariance values for the three detector CFS is shown in FIG. 2. The available three variances and three covariances are shown for the best imaging focus case when lens 10 is focused at plane 25. In this state the data are symmetric about said plane and the sensor provides the following conditions as exemplified in the figure using equation (1) as implemented in covariance processor 30:

CFS best imaging focus conditions—three detectors

1. Variance result: $C_{bb}$ is maximum and $C_{aa}=C_{cc}<C_{bb}$ or peak variance is at focal position $L_{pk}=b$ and the focus error is zero.

2. Covariance null result: $C_{ab}-C_{bc}=0$ which supports result $L_E=0$.

The output contrast signals $S_a$, $S_b$, and $S_c$ from detectors 21, 22 and 23, respectively, are supplied to microcomputer based covariance signal processor 30 which provides three variance values $C_{aa}$, $C_{bb}$, and $C_{cc}$; and three covariance values $C_{ab}$, $C_{bc}$, and $C_{ac}$, as shown in the figure, to the curve fit/peak location processor 40. The processor 40 receives the variance and covariance data and performs curve fitting to determine the location of the plane of best focus for object 12, $L_{pk}$, in accordance with a three detector CFS algorithm, condition 1 above.

If desired or necessary a mixed null using the covariance $C_{ac}$ and either or both of the variances, $C_{aa}$ and $C_{cc}$ can also be used for a null verification of best focus attainment. In the invention, the covariance null and mixed nulls may be used in combination for verification of peak sensor response at focal position b, the location of the best imaging focus plane 25.

There are several approaches for CFS exploitation of higher-order covariances. The following approach for the three detector sensor highlights the increased relational information supplied by the present invention.

THREE DETECTOR CFS ALGORITHM

1. Compute the higher-order covariances $C_{jk}$ for j,k=1,2,3; j—k and zero-order covariances $C_{jj}$, j=1,2, 3 using signals from the three detectors (detector locations are symbolically coded as a =1, b=2, and c=3) to develop the six possible datum; $C_{aa}$, $C_{bb}$, $C_{cc}$, $C_{ab}$, $C_{bc}$, and $C_{ac}$.

2. Determine the difference between $C_{ab}$ and $C_{bc}$ and compare to predetermined threshold value. If the difference is less than the threshold value, the sensor is at best focus and go to step 5. If the difference is greater than the threshold value, proceed to next step. (Optionally, determine the difference between $C_{aa}$ and $C_{ac}$ and the difference between $C_{cc}$ and $C_{ac}$ and compare to a predetermined threshold value. If the difference is greater than the threshold, proceed to next step. Else, go to step 5.)

3. Best-fit a continuous function to the three zero-order datum, $C_{aa}$, $C_{bb}$ and $C_{cc}$ and determine the focal plane location from the peak of the fitted function. Determine the distance, $L_E$, of this peak from the best imaging focus plane at position b. Drive the lens using lens positioning assembly 60 of FIG. 1 a distance which reduces $L_E$ to zero thereby regaining best imaging focus.

4. Repeat steps 1–3 for the adjusted focus position.

5. Stop

The accuracy of the fitted results shown in FIG. 2 and 3 are related to the number of detectors and pixels per detector. Curve fitting accuracy is associated with the number of covariance samples and the precision of the covariance computation. The CFS, in providing three additional datum provides increased curve fit accuracy, and, concurrently, by using covariances, which are less affected by detector noise supplies improved computational accuracy.

Results are readily extended to CFS systems with more than three detectors. As this number increases, there is a geometric increase in the number of covariance samples and, correspondingly, in the effectiveness of the invention. Whereas there are only three covariances available with the three detector CFS, there are six available with a four detector system, 10 available with a five detector system, and so on according to the formula D·(D+1)/2 where, D is the number of detectors used in the CFS system.

There are many options for using the covariance data as a means of increasing the effective number of data points. One approach uses the covariances as approximations to the slope of the through focus variance data set at the best focus focal plane position, see the dotted line in FIG. 2. A non-zero slope is equivalent to a non-zero null and indicates a defocused lens. The greater the slope, the more severe the defocus condition with zero slope indicative of best imaging focus attainment. A second method uses the peak of the fitted through focus covariances to estimate additional variances thereby increasing the number available for curve fitting. Although the former approach is applicable to three detector sensors; see algorithm step 2 above, the latter requires a minimum of four detectors in order to obtain the minimum of three covariances required for second-order curve fitting. Because of the latter constraint, both concepts are considered in the next section on four detector sensors.

FOUR DETECTOR CFS

In the four detector sensor, the following four variances and six covariances are available as follows:

Four variances: $C_{aa}$, $C_{bb}$, $C_{cc}$, $C_{dd}$ six covariances: $C_{ab}$, $C_{bc}$, $C_{cd}$, $C_{ac}$, $C_{bd}$, $C_{ad}$ The six covariance values increase the number of values for estimation of lens focus position and thereby the degrees-of-freedom available for sensor design optimization in terms of the product of the number of detectors and the number of photosensors per detector.

Figure 4:
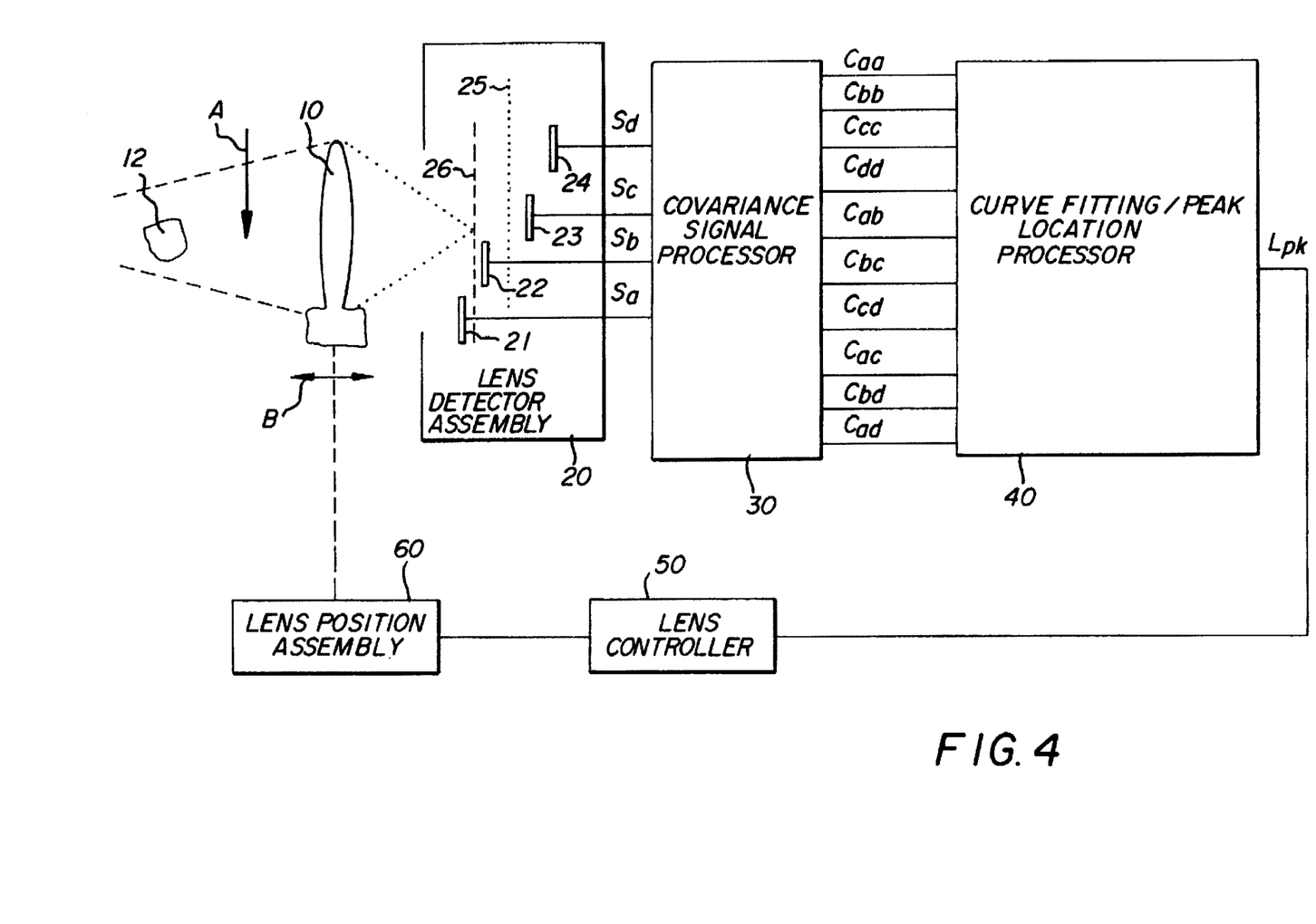
FIG. 4 is a schematic diagram of a scanning four detector CFS as used in the peak-mode of operation.

FIG. 4 presents a four detector CFS. The general signal flow of the four detector system is equivalent to that of the three detector sensor of FIG. 1 and will not be repeated in this section. Only the differences afforded by using increased covariance samples and an even number of detectors are emphasized.

The $C_{aa}$, $C_{bb}$, $C_{cc}$ and $C_{dd}$ variance values obtained from respective contrast signals $S_a$, $S_b$, $S_c$, and $S_d$ from detectors 21, 22, 23, 24, respectively, as located in the lens detector assembly 20 are functions of their positions, a, b, c, d, relative to the plane of best imaging focus 25. The covariance readout values for detector pair (21, 22) and pair (22, 23) and pair (23, 24) are functions of lens focus relative to midway positions at (a+b)/2 for $C_{ab}$; at (b+c)/2 for $C_{bc}$; at (c+d)/2 for $C_{cd}$ respectively. The covariance results $C_{ac}$ and $C_{bd}$ are associated with (a+c)/2 and (b+d)/2 positions and the covariance $C_{ad}$ is associated with the (a+d)/2 position. The four detector system has four variances and six covariances for use in determining $L_E = L_{pk} - (L_{ref} = b)$, the amount of correction required to attain lens best focus.

A key difference between FIG. 1, a three detector CFS, symbolic of the odd-number detector sensor, and FIG. 4, a four detector CFS, symbolic of an even-number detector sensor, is the physical absence of a sampling detector at the plane of best imaging focus 25. In the case of the odd number detector system, the plane of best imaging focus is calibrated at or conjugate to the centrally located detector 22 of FIG. 1. All other detectors pairs are calibrated to symmetrically bracket the central detector 22 location. Thus, when the lens is at best imaging focus, the peak variance occurs at the centrally located detector with smaller variance values from its outboard counterparts. In contrast, the even-number detector case, symbolized by FIG. 4 for four detectors, shows that detector pairs such as (21, 24) and (22, 23) symmetrically bracket best imaging focus plane 25. Although there is no focal plane sampling detector physically located at plane 25 at position (b+c)/2, the CFS supplies covariances which maximize at such detector pair mid-positions and thereby provide 'virtual' detectors at these locations. This implicit halving of focal plane sampling granularity is particularly exploitable because of the strong symmetry associated with the through—focus signal.

Figure 5:
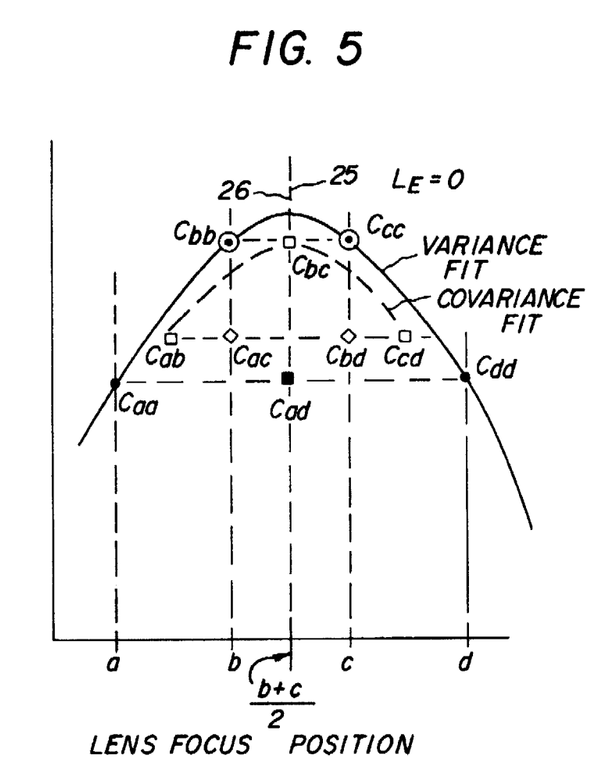
FIG. 5 is a curve fit of the variances/covariances of the signals produced by the CFS of FIG. 4 plotted against detector location for the best focus case.

FIG. 5 shows the four variance and six covariance values for the four detector CFS. A significant feature of the figure is the symmetry about the best imaging focus plane 25. In particular, the four variances and three covariances provide the minimum three values for curve fitting and thereby provide an additional estimate of lens focus. This result is provided by the curve fitting/peak location processor 40 of FIG. 4. The fitted zero-order and first-order data peak at the best imaging focal plane 25 midway between detector pairs 22 and 23 and detector pairs 21 and 24 as required for best imaging. The available covariances $C_{ac}$, $C_{bd}$, and $C_{ad}$ can be used for null processing in support of the covariance peak location results as similarly provided in the above three detector five-step algorithm.

FIG. 5 illustrates the use of covariances as a means for generating variances beyond the four available in the prior art four detector VFS. Note that in the indicated best focus case the second-order covariance $C_{bc}$ is peaked at focal plane position (b+c)/2. Note also that both variances $C_{bb}$ and $C_{cc}$ at positions b and c, respectively, are equal to the peak second-order covariance $C_{bc}$. These values are indicated by the open circle symbols at focal positions [(b+c)/2]±[(b−c)/2]. The two values are treated as variances which supplement the four available with the prior art VFS. The additional virtual variance samples provide increased curve fitting accuracy for the symmetric best imaging focus case. The CFS best fitting algorithm provides the added weighting by using all six data, the four variances (used in the VFS) and two 'virtual' variances. Subsequent sections will discuss this CFS method which is generalizable to covariances obtained from n-detector (n>4) systems.

Figure 6:
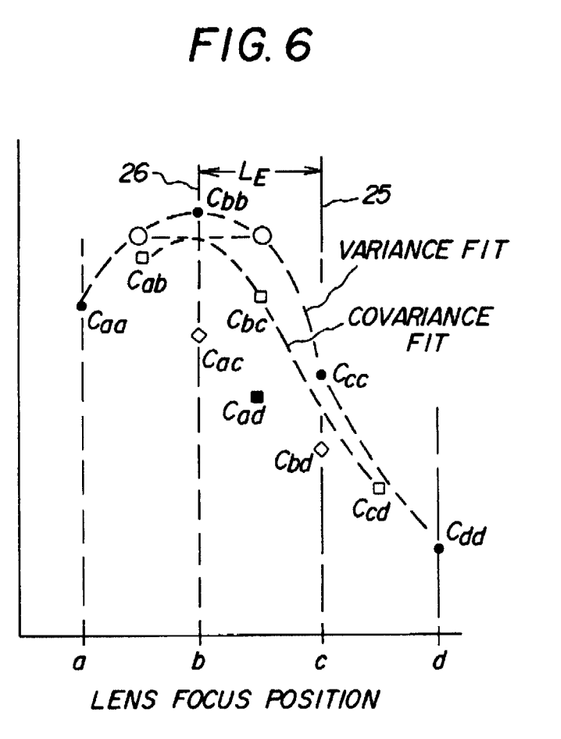
FIG. 6 is a graph showing the variances/covariances of the signals produced by the CFS of FIG. 4 plotted against detector location for the defocus case.

If best focus for object 12 is lost due to relative movement between lens and object, lens focus moves to exemplary plane 26 as displaced $L_E$ units from best imaging focus plane 25. Detectors 21, 22, 23, and 24 supply signals Sa, Sb, Sc, and Sd, respectively to covariance signal processor 30 which develops the ten variance/covariance values available from a four detector CFS. The values are transmitted to the curve fit/peak location processor 40 which computes the peak locations for the variance and covariance values and the corresponding focal plane locations for said peaks, $L_{pk0}$ and $L_{pk1}$, respectively. FIG. 6 shows such exemplary results where the through focus variance and covariance data are now symmetric about focal plane position 26, $L_E$ units to the left of best imaging focus plane 25. A signal proportional to the average of Lpk0 and lpk1, say $L_{pk}$ to lens controller 50 which computes the difference $L_{pk} - L_{REF} = L_E$, repositions lens 10 to best imaging focus plane 25 using the lens positioning assembly 60. The latter mechanism moves lens 10 in the direction of arrow B to reduce the signal $L_E$ to zero, as indicated in FIG. 5, to regain best imaging focus at plane 25.

FIGS. 5 and 6 show the multiple null combinations available for supporting the attainment of the best focus condition. As indicated, the following equalities are noted in the FIG. 5 depiction of a lens at best focus.

Set 1: $C_{bb}$, $C_{cc}$, $C_{bc}$

Set 2: $C_{ab}$, $C_{cd}$, $C_{ac}$, $C_{bd}$

Set 3: $C_{aa}$, $C_{dd}$, $C_{ad}$

At best focus, the values each of the covariances in each set are equal (fall on a zero-slope best-fit line, see the dotted lines of FIG. 5) and are thus useful as null indicators of the best imaging focus state of the lens.

Figure 7:
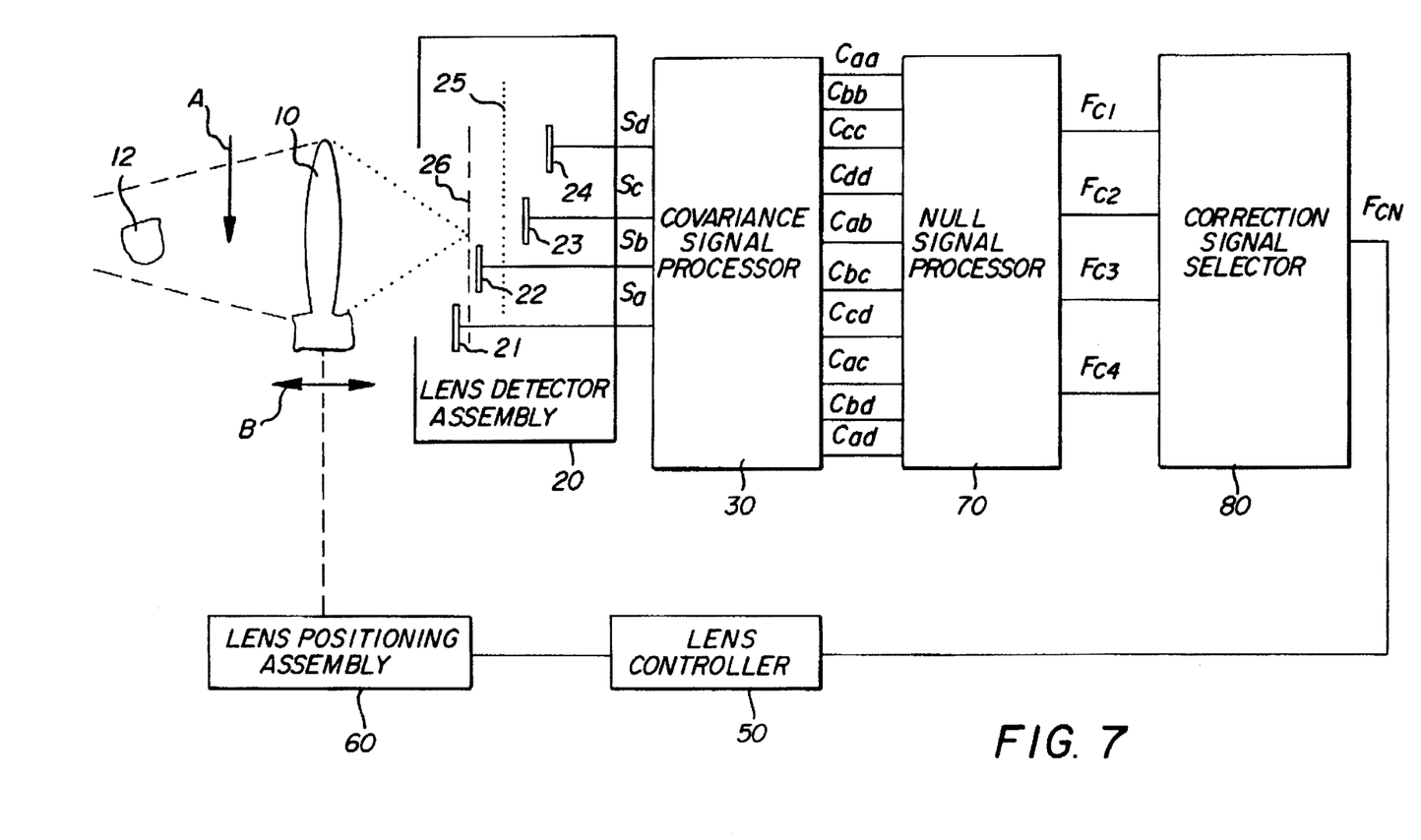
FIG. 7 is a schematic diagram of a scanning four detector CFS as used in the null-mode of operation.

The design of a dedicated null mode CFS embodiment that exploits this result is obtained by replacement of the curve fitting/peak location processor 40 of FIG. 4 by the null signal processor 70 and correction signal selector 80 depicted in FIG. 7. In this CFS configuration, the computed variances/covariances are input to the null signal processor 70 which uses the above null algorithms for estimation of best focus. In the indicated embodiment, the null values are in a normalized form, denoted for example as $FC_2 = (C_{ac} - C_{bd})/(C_{ac} + C_{bd})$, as selected from set 2 above. The nulls, are normalized by the sum of the nulled covariances to reduce processor dynamic range requirements due to changes in scene pictorial detail.

The null combination denoted $F_{CN}$ is selected on the basis of signal-to-noise using adaptive filters, such as the KALMAN filter, as provided in the correction signal selector 80. The filtered signals are transmitted to lens controller 50 for lens focus adjustment in the direction of arrow B direction by the lens positioning assembly 60.

This null mode CFS autofocus system is used when processing speed is critical and the time saved from required curve fitting and peak location determination is a significant part of the focus control cycle. The operation of the null mode CFS of FIG. 7 and the peak location mode CFS of FIG. 4 are refined in the detailed description below.

Figure 8:
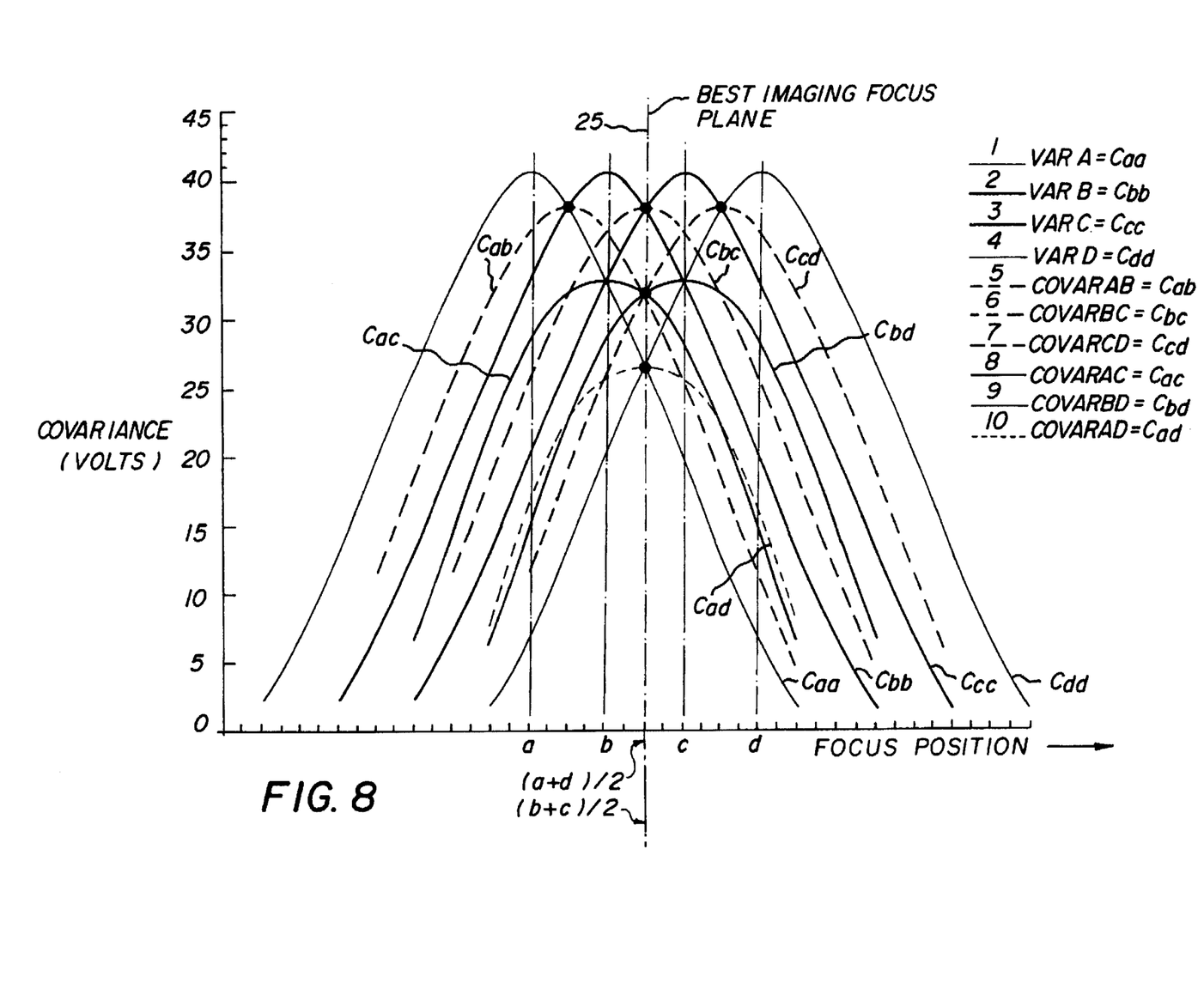
FIG. 8 is the theoretical through focus plot of all variances/covariances for the four detector CFS of FIG. 4 or 7.

The number of variance/covariance combinations are relatively large, even for the four detector sensor. In order to clearly delineate the variety of potential data interactions, FIG. 8 provides the theoretical through focus results for all ten variance/covariance combinations available with the four detector CFS sensor. The figure shows the expected result when lens focus is varied over a focus range that brackets the four detector locations a, b, c, & d. The figure illustrates the through focus symmetry about the best imaging focus plane 25. As the lens focus approaches the best imaging focus position 25 at calibrated position (b+c)/2, the figure illustrates the rapid increase in the number of null virtual variance computational possibilities. In fact, the figure indicates that the number of variance/covariance intersections (and potential equalities) are maximal at the best imaging focus plane 25 where accuracy is most needed. For example, note the equality of $C_{bc}$ with $C_{bb}$ and $C_{cc}$ when the lens is focused at focal plane position (b+c)/2. This information is programmed into correction signal selector 80 of FIG. 7.

FOUR DETECTOR CFS

DETAILED EMBODIMENTS

Two forms of CFS embodiments are considered, the first uses curve fitting to locate the variance/covariance peak-denoted peak mode operation; the second emphasizes differencing null mode operation. The peak mode CFS uses variance/covariance curve fitting to determine covariance peak location as indicative of lens focus position. The second emphasizes the difference between such values for closed-loop correction and is denoted herein as a null mode CFS.

PEAK MODE EMBODIMENT

Figure 9:
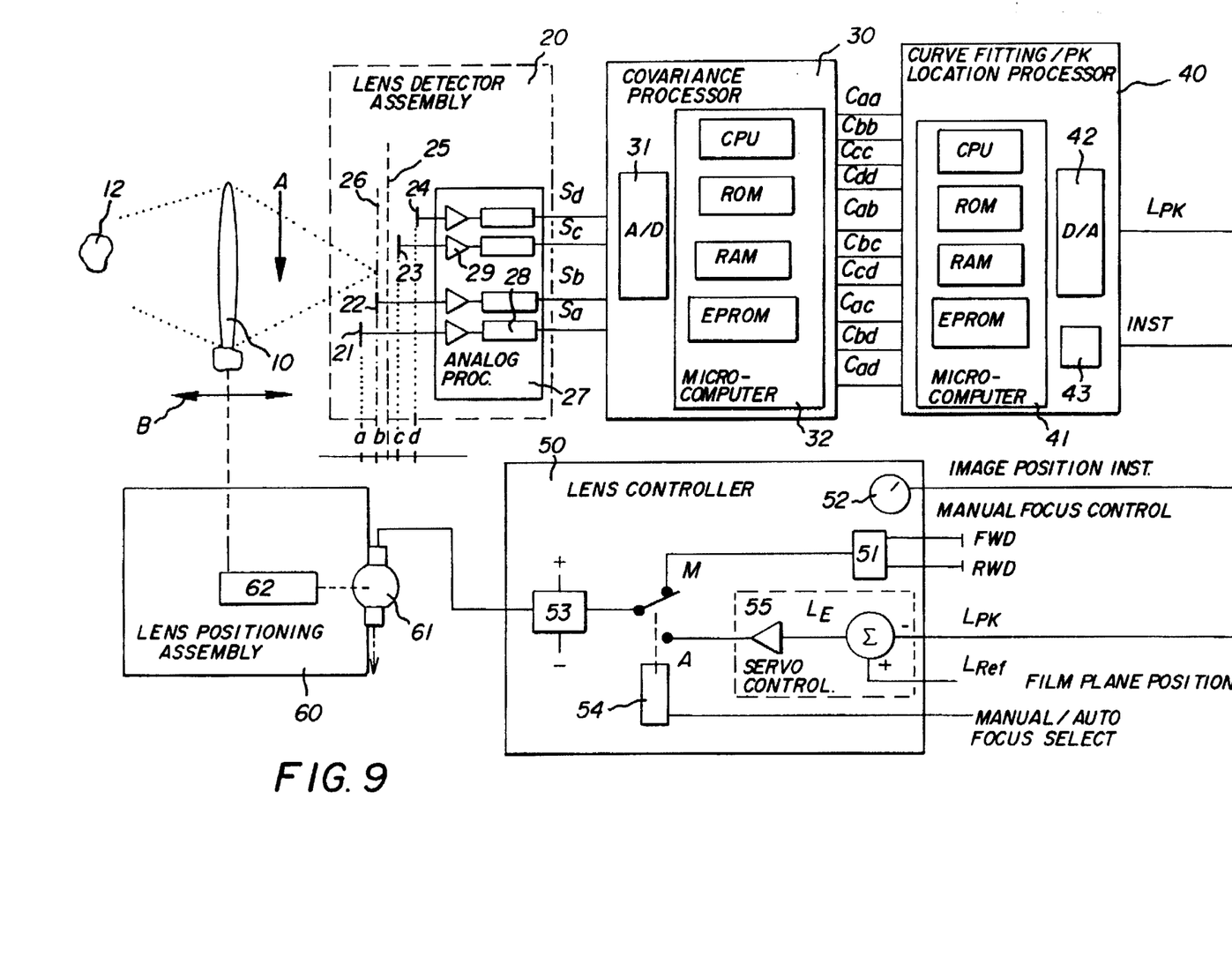
FIG. 9 is a detailed block diagram of a scanning four detector CFS as used in the peak-mode of operation.

FIG. 9 shows the peak mode CFS embodiment as used in a photographic system. Lens 10 forms an image of an object 12 on the lens focal plane 26. The detectors 21, 22, 23 and 24 located at positions a, b, c, and d, respectively, in the lens detector assembly 20, provide image contrast signals $S_a$, $S_b$, $S_c$, and $S_d$ respectively. Each signal is modulated by the defocus position or image plane optical path distance relative to best imaging focus plane 25 as calibrated midway between the detector pair (22, 23) and, simultaneously, detector pair (21, 24). The principle of sensor operation is similar to that discussed earlier with respect to the three detector CFS and will not be repeated here.

The output of each of the detectors 21, 22, 23 and 24 are clocked out on a sample basis and sent to the analog processor unit 27 which includes detector preamplifiers 29 and a bandpass filter 28. Note, the preamplifier may be part of the detector array. An AC coupling capacitor in the bandpass filter provides low temporal frequency noise filtering (e.g. 1/f noise) and also provides a zero mean signal to simplify covariance calculations. The resulting sampled analog output signals contain signal and noise and are designated as $S_a$, $S_b$, $S_c$ and $S_d$ with contrasts that are functions of lens defocus -i.e. the lens defocus modulation transfer function (DMTF). The analog signals $S_a$, $S_b$, $S_c$ and $S_d$ are clocked in to the covariance processor 30 and digitized by Analog to Digital converter 31. The digitized samples are sent to a microcomputer 32 including basic operating components such as a CPU, ROM, RAM and EPROM elements, execute the variance/covariance algorithms as defined by equation (1).

The digital representations of the computed variances/covariance data points are then sent to the Curve Fitting/Peak Location Processor 40 for executing the curve fitting, peak detection and peak location algorithms known to the art. The variance data values used in fitting the variance curve are associated with detector 21, 22, 23 and 24 and provide the four variance values $C_{aa}$, $C_{bb}$, $C_{cc}$, and $C_{dd}$, respectively. Each detector is at a calibrated focal position, $C_{aa}$ at position a, $C_{bb}$, at position b, $C_{cc}$, at position c, and $C_{dd}$ at position d. In contrast, the covariance data values are located at the midway positions between detector pairs - i.e., $C_{ab}$ at (a+b)/2; $C_{bc}$ at (b+c)/2, $C_{cd}$ at (a+d)/2; etc. Since detectors are not located physically at these focal positions, such higher-order results are associated herein with 'virtual' detectors. Similarly, the covariance data $C_{ac}$ and $C_{bd}$ are associated with the (a+c)/2 and (b+d)/2 virtual detector locations and the covariance data $C_{ad}$ is associated with the (a+d)/2 virtual detector location.

The location of the best imaging focal plane 25, denoted, $L_{pk}$, is obtained as the location corresponding to the peak of the curve fits as discussed earlier and is shown in FIGS. 5 and 6. As indicted, the four detector CFS variance plot has four data points for curve fitting -i.e., $C_{aa}$, $C_{bb}$, $C_{cc}$ and $C_{dd}$. Covariances $C_{ab}$, $C_{bc}$ and $C_{cd}$ provide three data points for curve fitting. The covariances $C_{ac}$ and $C_{bd}$ provide two points and the covariance $C_{ad}$ provides one point. The last two covariance sets have insufficient data for curve fitting and are only usable in conjunction with calibration or theoretical data. The digital representation for $L_{pk}$ is converted to an analog signal prior to being sent to lens controller 50. Instrumentation (e.g., telemetry) for the $L_{pk}$ signal is available to the photographic system operator as supplied by instrumentation unit 43 to the instrumentation signal meter 52 of the lens controller 50. Manual or autofocus focus position control is used to obtain proper focus by moving lens 10 using lens translation mechanism 62 in lens positioning assembly 60.

Focus is corrected manually when mode control switch 54 is powered to manual position M and engaging manual operation controller 51 in either the forward (FWD) or rearward (RWD) direction. Lens 10 is moved by the linear motor drive 61 which activates lens translator mechanism 62 through the motor amplifier bridge assembly 53 of the lens controller 50. The focus control operator activates such mechanisms until the focus error correction signal, $L_E$, as read-out from instrumentation signal meter 52, is nulled visually or by using an equivalent sensory indicator such as a bell. At this event, movement is stopped by disengaging the manual operation controller 51. When $L_E$ is minimized to within a specified threshold, the lens is nominally focused at best imaging focus plane 25. If the required lens movement for the lens is toward the film plane, a positive voltage will be supplied and if away from the film plane, a negative voltage is supplied to the linear motor drive 61 of lens positioning assembly 60.

Autofocus is achieved by powering mode control switch 54 to autofocus position A. The servo controller 55 of the lens controller 50 compares the digital representation of the maximum covariance location $L_{pk}$ with a digital representation of $L_{REF}$, the reference and calibrated location of best imaging focus plane 25. An error signal $L_E$ is generated which automatically applies the appropriate plus or minus voltage to linear motor drive 61. As in the manual operational mode, best focus is achieved when the error signal $L_E$ is zero or within a defined tolerance about zero. A zero signal, or a signal within a prescribed lower threshold, disables linear motor drive 61 operation indicating that the lens is in best imaging focus and ready for picture taking.

The following algorithms supply exemplary logic embodiments for the four detector CFS and would reside in curve fitting/peak location processor 40.

Algorithm 1: Variance and Covariance Averaged Best Imaging Focus Location

1. Read N samples from each of four CFS detectors.
2. Compute the covariance data points from the three detector pair signals for the sample interval selected. i.e. determine $C_{ab}$, $C_{bc}$ and $C_{cd}$ for N samples. The location of these virtual covariance detectors are midway between the adjacent detectors. These 'virtual' detector locations are at focal plane positions (a+b)/2 for $C_{ab}$, (b+c)/2 for $C_{bc}$ and (c+d)/2 for $C_{cd}$.
3. Fit a best fit polynomial or cubic spline interpolation for the three covariance data points.
4. Compute the covariance maximum location estimate for the primary lens as the focal plane position where the first derivative of the fitted function is zero. Call this location $L_{pk1}$, a first estimate of the plane at which the lens is focused.
5. Compute the variance data points from the signals from the four detectors for the sample interval selected. i.e. $C_{aa}$, $C_{bb}$, $C_{cc}$ and $C_{dd}$ for N samples.
6. Fit a best fit polynomial or least-squares cubic spline interpolation for these variance data points. Estimate the covariance peak value and its location using these four values which are at focal plane positions a, b, c and d for $C_{aa}$, $C_{bb}$, $C_{cc}$ and $C_{dd}$ respectively.
7. Compute the variance peak location estimate for the lens as the position where the first derivative of the fitted variance curve is zero as at step 4 above. Call this location $L_{pk0}$.
8. Average these two peak locations to obtain a best estimate of lens focus.

$$L_{pk}=[L_{pk0}+L_{pk1}]/2.$$

9. Compare image location value $L_{pk}$ to the best imaging focus location 25, and determine the difference as defocus error $L_E$. $L_E=L_{PK}-L_{REF}$
10. If $|L_E|<\delta$, where $\delta$ is a predetermined threshold value, go to step 15, else continue.
11. Move the lens assembly by manually actuating the linear motor drive 61 to move the lens translation mechanism 62 to correct the lens defocus error $L_E$ by observing $L_{pk}$ instrumentation signal meter 52. Or enable the servo controller 55 which will automatically in closed loop operation will actuate the linear motor drive 61 and lens translator mechanism 62 to correct for lens defocus.
12. If $|L_{PK}-L_{REF}|<\delta$, go to 14, else go to 13.
13. Actuate lens controller 50 to drive lens 10 to best imaging focus plane 25.
14. Go to step 1
15. Stop The following alternative or supplementary algorithm also utilizes a best-fit polynomial or least-squares cubic spline fit and knowledge of DMTF symmetry to best fit the zero and first-order covariance curves of a four detector sensor in an iterative fashion. Its distinctive feature is a development of two 'virtual' variance data points from knowledge of the peak magnitudes of the covariance data.
Algorithm 2: Virtual Variance Augmented Best Focus Location 1. Read N samples from each of four CFS detectors.
2. Compute the covariance values $C_{ab}$, $C_{bc}$ and $C_{cd}$ with 'virtual' detector locations at (a+b)/2 for $C_{ab}$, (b+c)/2 for $C_{bc}$ and (c+d)/2 for $C_{cd}$
3. Compute variance values $C_{aa}$, at detector location a, $C_{bb}$ at detector location b, $C_{cc}$ at detector location c and $C_{dd}$ at detector location d.
4. Fit a best fit polynomial or least-squares cubic spline to the above six value variance covariance data set ($C_{aa}$, $C_{ab}$, $C_{bb}$, $C_{bc}$, $C_{cc}$ ... $C_{cd}$, $C_{dd}$) at respective focal plane locations listed above.

5. Determine the focal plane location at which the fitted function peaks by setting first derivative of the function to zero and solving for the peak focal plane; $L_{PK}$.
6. Compute $$L_E = L_{PK} - L_{REF}, L_{REF} = \frac{(b+c)}{2} = \frac{(a+d)}{2} =$$

location of best imaging focus.
7. If $|L_E|<\delta>0$ with $\delta$ a maximum determined noise threshold, go to step 10.
8. Drive lens 10 a distance $L_E$.
9. Go to 1.
10. Stop, the lens is at best focus.

It will be obvious to those skilled in the field of image data processing that the above two algorithms represent a small sample of the many possible alternative variance/covariance algorithmic embodiments.

NULL MODE EMBODIMENT

Figure 10:
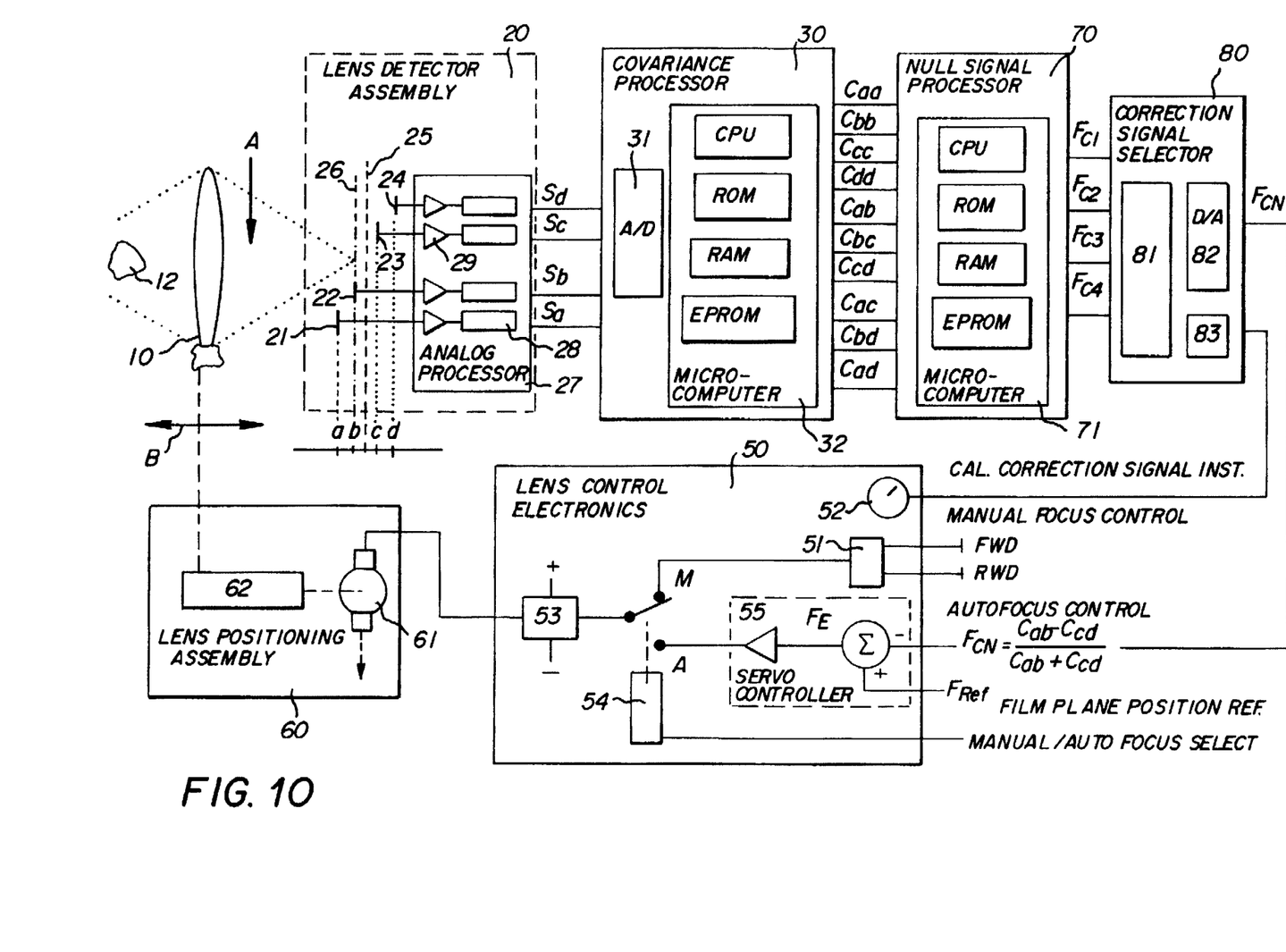
FIG. 10 is a detailed block diagram of a scanning four detector CFS as used in the null-mode of operation.

FIG. 10 shows a block diagram of a CFS embodiment for autofocus applications using variance/covariance nulling. This system is an alternate embodiment to the above peak-mode CFS where the curve fitting/peak location processor 40 is replaced with null signal processor 70 and correction signal selector processor 80 for best focus assessment. The following discussion emphasizes the function of these units since the operation of the remaining elements is equivalent to those of the peak-mode CFS.

The four detector CFS sensor of FIG. 10 increases nulling accuracy by defining the desired location for best imaging focus (e.g.- film plane location) to be midway between photosensors 22 & 23 and simultaneously between 21 & 24. Thus, the following best focus variance/covariance null relationships hold when the lens is in the best imaging focus state:

$C_{aa}-C_{dd}=0$
$C_{ab}-C_{cd}=0$
$C_{ac}-C_{ab}=0$
$C_{ab}-C_{cd}=0$
$C_{ac}-C_{bd}=0$
$C_{ad}-C_{dd}=0$
$C_{bb}-C_{cc}=0$

The variance/covariance values used in these equalities were schematically indicated in FIG. 5 where variance/covariance are at best imaging focus. FIG. 6 shows the case where lens 10 is not at best imaging focus. The magnitude and sensitivities of the focus correction signals associated with each of these nulls is different and is dependent on the location of the detectors relative to the best imaging focus plane 25 as calibrated midway point between detector pairs relative to said points deviation from the lens best focal plane location 25 and the slope of the defocus modulation transfer function (DMTF) curve at the various null points. Variance/covariance focus error signal amplitude/sensitivity relations are indicated in FIG. 8 by the crossover points in the variance/covariance through focus curves at lens focus position (b+c)/2, the position of best imaging focus.

The following null relations specify selected algorithmic covariance null signals, as shown in FIG. 10, relative to the available ten through focus covariance signals for the CFS embodiment.

$$(C_{aa}-C_{dd})/(C_{aa}+C_{dd})=F_{c1} \text{ (variance null)} \quad (3)$$

Provides excellent focus range and sensitivity (i.e.- slope of through focus covariance signal at null point) but has a low null point signal strength.

$$(C_{bb}-C_{cc})/(C_{bb}+C_{cc})=F_{C2} \text{ (variance null)} \quad (4)$$

Provides strong null point signal strength but has the smallest focus range and sensitivity $$(C_{ab}-C_{cd})/(C_{ab}+C_{cd})=F_{C3} \text{ (covariance null)} \quad (5)$$

Provides greater immunity to signal contamination by uncorrelated noise and a higher null point signal strength than (3).

$$(C_{ac}-C_{bd})/(C_{ac}+C_{bd})=F_{C4} \text{ (covariance null)} \quad (6)$$

Provides greater immunity to signal contamination by uncorrelated noise and also provides a higher null point signal strength but with less defocus sensitivity and range than (3)

As indicated the nulls are normalized by the sum of the covariances used in their computation. This removes the effects of changing scene content on non-zero null magnitudes thereby improving detector dynamic range requirements.

In the null mode sensor the digitized signals are input to the null signal processor 70 using micro-computer 71 develops variance/covariance nulls, in particular, those noted above as $F_{C1}$, $F_{C2}$, $F_{C3}$, and $F_{C4}$. The four selected covariance nulls represent a preferred set of null conditions that bracket a gamut of focus error dynamic range/sensitivity combinations as indicated in FIG. 8. The variance/covariance nulls are input to the correction signal selector processor 80 in which SNR (signal-to-noise ratio) conditions associated with the four nulls are developed and allow a selection of covariance differences that yield a maximal (range)·(sensitivity) product for use in determining an optimally weighted focus correction null designated as $F_{CN}$. For example, an adaptive KALMAN filter operates as best null signal and weights each according to SNR robustness. In the FIG. 10 result, $F_{CN}$ is the normalized covariance $(C_{ab}-C_{cd})/(C_{ab}+C_{cd})$. Typically, a central covariance null is optimal when the lens focus is close to best imaging focus as indicated by the dotted line of FIG. 8. Each possible through focus null (indicated by the intersection points in FIG. 8) represent a wide gamut of signal strength and sensitivity combinations. The CFS can exploit such characteristics to obtain corrections that optimize focus error SNR by using such combinations in the logic of an adaptive CFS lens controller. The adaptive CFS, can be in the form of a digital signal processor (DSP) chip, denoted an adaptive covariance mode selector unit (ACMSU) 81 in FIG. 10, processes current variance/covariance signal strength and dynamic range conditions and computes a null(s) with optimal SNR for focus state assessment. For example, when the lens is at best imaging focus, the variances for the two signals from detectors at focal positions a and d provide a signal of approximately 27 variance units according to FIG. 8. However, the covariances $C_{ab}$ and $C_{cd}$ at positions (a+b)/2 and (c+d)/2, respectively provide a null signal that is about 38 covariance units or about 11 units greater. In the case of the four detector CFS the ACMSU 81 would preferentially weight such variance/covariance relationships relative to others thereby providing optimal range and sensitivity for a given defocus state.

The selected covariance null signals are converted from a digital to an analog signal by A/D converter 82 and an analog $F_{CN}$ is output to the Lens Controller 50. This value is analogous to $L_{pk}$ of the peak mode CFS shown in FIG. 9.

When switch 54 is powered to position A, the autofocus mode is operative and an automatic differential of $F_{CN}$ with $F_{ref}$ is obtained. Typically $F_{ref}$ is zero, the ideal representation for a perfect null, but could be non-zero to account for a potential focus error bias. The Lens Controller 50 provides $F_{CN}$ as input to the servo controller assembly 55 which differences said signal with $F_{ref}$ to obtain $F_E$. This signal activates linear motor drive 61 of lens positioning assembly 60 which automatically positions lens 10 at best focus. Lens focus is thereby shifted from, say, defocus plane 26 to best imaging focus plane 25. This signal is transmitted to the motor amplifier bridge assembly 53 which converts it to a voltage proportional to $F_E$. The voltage is provided to linear motor drive 61 of the lens positioning assembly 60, which drives lens 10 to the best imaging focal plane 25 from defocus plane 26. If the desired movement is toward the lens a positive voltage will be output by the servo controller 55; if away from the lens, an appropriate negative voltage is output by the lens controller. Lens movement ceases when error signal $F_E$ is within a predetermined constant of zero, the condition indicative of best imaging focus.

The manual mode of correction is obtained when mode control switch 54 is placed in position M. In this application, the operator would use instrumentation signal meter 52, which visually specifies the analog $F_{CN}$ signal voltage from instrumentation unit 83. The operator uses the voltage magnitude and sign thereof for manual adjustment of lens focus using manual operation controller 51 to reposition lens 10 for best focus. As shown in the figure, forward (FWD) and reverse (RWD) lens motion control is available. A visual null voltage indication is the operators signal that best focus is obtained and activation of the linear motor drive 61 is discontinued.

PARTS LIST 10 lens
12 object
20 lens detector assembly
21 detectors
22 detector
23 detector
24 detector
25 best imaging focus plane
26 best focus plane for out of focus object
27 analog processor unit
28 band pass filters
29 detector preamplifiers
30 covariance processor
31 analog/digital converter
32 micro computer
40 curve fit/peak location processor
43 instrumentation unit
50 lens controller
51 manual operation controller
52 instrumentation signal meter
53 motor amplifier bridge assembly
54 mode control switch
55 servo controller
60 lens position assembly
61 linear motor drive
62 lens translation mechanism
70 null signal processor
71 micro computer
80 correction signal selector
81 adaptive covariance mode selector unit
83 instrumentation unit

We claim:

1. A focus sensor for detecting the focus state of an image forming optical system relative to an object, the optical system having a plane of best imaging focus, comprising:

a) a plurality of image detectors located at a corresponding plurality of positions relative to the plane of best imaging focus for producing a respective plurality of image signals; and b) a signal processor connected to the image detectors for determining a position of best focus by calculating the covariances between respective pairs of the image signals.

2. The focus sensor claimed in claim 1, wherein the plurality of image detectors includes a first image detector located in front of the plane of best imaging focus, a second image detector located at the plane of best imaging focus, and a third image detector located behind the plane of best imaging focus.

3. The focus sensor claimed in claim 2, wherein the image detectors each have N pixels and the covariance is computed as:

$$C_{jk}=[1/(N-1)]\cdot[\Sigma(S_j(m)-S_j)\cdot(S_k(m)-S_k)]; m=1,2,3,\ldots,N,$$

where $S_j(m)$ and $S_k(m)$ are the signals produced by the detectors located at positions j and k respectively for read-out from pixels m =1 through N; $S_j$ is the mean value of all pixel signals produced by the detector located at position j; and $S_k$ is the mean value of all pixel signals produced by the detector located at position k.

4. The focus sensor claimed in claim 1, further comprising means for adjusting the image forming optical system such that the position of best focus coincides with the plane of best imaging focus.

5. A method of detecting the focus state of an image forming optical system relative to an object, the optical system having a plane of best imaging focus, comprising the steps of:

a) providing a plurality of image detectors located at a corresponding plurality of positions relative to the plane of best imaging focus for producing a respective plurality of image signals; and b) determining a position of best focus by calculating the covariance between respective pairs of the image signals.

6. The method claimed in claim 5, further comprising the step of adjusting the optical system such that the plane of best focus coincides with the plane of best imaging focus.

7. The method claimed in claim 5, wherein the determining step further comprises the steps of:

a) calculating at least three covariance values as a function of focal position;

b) fitting a best-fit polynomial through the covariance values; and c) determining lens best focus as the position where the first derivative of the fitted polynomial is zero.

8. The method claimed in claim 7, further comprising the step of adjusting the optical system such that the plane of best focus coincides with the plane of best imaging focus.

9. The method claimed in claim 7, further comprising the steps of:

a) calculating variance values as a function of focal position;

b) estimating a pair of virtual variance from the location of the peak of the best-fit polynomial through the covariance values; and c) employing the virtual variances and the calculated variances to determine lens best focus position.

10. The method claimed in claim 9, further comprising the step of adjusting the optical system such that the plane of best focus coincides with the plane of best imaging focus.

11. The method claimed in claim 5, wherein the determining step further comprises the steps of:

a) calculating at least two covariance values as a function of focal position;

b) calculating the difference between the two covariance values; and c) determining lens best focus as the position where the difference is zero.

12. The method claimed in claim 11, further comprising the step of adjusting the optical system such that the plane of best focus coincides with the plane of best imaging focus.

* * * * *